US012516571B2

(12) United States Patent
Damek et al.

(10) Patent No.: US 12,516,571 B2
(45) Date of Patent: Jan. 6, 2026

(54) RAIL SYSTEMS, SHUTTLE ASSEMBLIES, AND METHODS OF USE

(71) Applicant: Honeywell Safety Products USA, Inc., Charlotte, NC (US)

(72) Inventors: Tomáš Damek, Frýdek-Místek (CZ); Tanguy Prevot, Brno (CZ); Petr Lopusnik, Brno (CZ)

(73) Assignee: Honeywell Safety Products USA, Inc., Latham, NY (US)

( * ) Notice: Subject to any disclaimer, the term of this patent is extended or adjusted under 35 U.S.C. 154(b) by 90 days.

(21) Appl. No.: 18/348,640

(22) Filed: Jul. 7, 2023

(65) Prior Publication Data

US 2025/0012148 A1 Jan. 9, 2025

(51) Int. Cl.
*E06C 7/18* (2006.01)
*A62B 35/00* (2006.01)

(52) U.S. Cl.
CPC .......... *E06C 7/187* (2013.01); *A62B 35/0062* (2013.01); *A62B 35/0087* (2013.01)

(58) Field of Classification Search
CPC . E06C 7/187; E06C 7/12; E06C 7/186; E06C 9/02; A62B 35/0062; A62B 35/0087
USPC .......................................................... 248/558
See application file for complete search history.

(56) References Cited

U.S. PATENT DOCUMENTS 3,902,700 A * 9/1975 Cox .......................... E06C 7/48 187/241
4,546,855 A 10/1985 Lyons
6,330,861 B1 * 12/2001 Flux .................. A62B 35/0087 104/115
8,517,144 B2 8/2013 Cuccurullo et al.
8,602,163 B2 12/2013 Davis, Jr.
2022/0220806 A1 7/2022 Rogers, III
(Continued)

FOREIGN PATENT DOCUMENTS

CN 108096738 A 6/2018
DE 4219401 C1 8/1993
(Continued)

OTHER PUBLICATIONS

Southwest Scaffolding & SUPPLY, “Roof Anchor / 12" Galvanized Steel”, retrieved from the Internet at URL: <https://scaffoldingrentalandsales.com/roof-anchor-/-12-galvanized-steel/> on Nov. 14, 2023, 2 pages.
(Continued)

*Primary Examiner* — Muhammad Ijaz
(74) *Attorney, Agent, or Firm* — Fredrikson & Byron, P.A.

(57) ABSTRACT

Methods, systems, assemblies, and/or the like are provided. According to various embodiments, there is provided a rail system including a vertical rail aligned vertically and including a vertical track; a changeover rail comprising a first portion, second portion, and a changeover track, wherein the first portion is configured to operably connect to the vertical rail, wherein the second portion is configured to be fixedly connected to a post, wherein the changeover track is disposed along the first and second portions, wherein the vertical track and the changeover track are configured to be aligned to form a track configured to receive a shuttle assembly configured to travel along the track; and a changeover mechanism configured to operably attach the vertical rail and the changeover rail.

12 Claims, 12 Drawing Sheets

(56) References Cited

U.S. PATENT DOCUMENTS

| | | | | |
|---|---|---|---|---|
| 2023/0048647 | A1 | 2/2023 | MacKarvich | |
| 2023/0234811 | A1* | 7/2023 | Esposito | E06C 1/12 187/239 |
| 2024/0252854 | A1* | 8/2024 | Damek | A62B 35/0081 |
| 2024/0424326 | A1* | 12/2024 | Hrouzek | E06C 7/187 |
| 2025/0012148 | A1* | 1/2025 | Damek | A62B 35/0062 |

FOREIGN PATENT DOCUMENTS

| | | | |
|---|---|---|---|
| EP | 3722539 | B1 | 4/2022 |
| WO | 2017/207137 | A1 | 12/2017 |

OTHER PUBLICATIONS

Extended European Search Report Mailed on Nov. 6, 2024 for EP Application No. 24179872, 9 page(s).

* cited by examiner

RAIL SYSTEMS, SHUTTLE ASSEMBLIES, AND METHODS OF USE

TECHNICAL FIELD

The present disclosure relates generally to rail systems. In particular, it relates to rail systems for use with shuttle assemblies to reduce falling injuries.

BACKGROUND

Technicians may use rail systems and/or shuttle assemblies for their own safety when working at altitudes where a fall could cause serious damage to the technicians' bodies, as well as to any equipment they may be carrying. A shuttle assembly may be attached to and/or integrated with a rail system and/or ladder that the technician is climbing to reach the height where work is required. For example, a shuttle assembly may have one or more components configured to secure or "anchor" technicians to the rail system and/or ladder, such that if they lose their grip, the shuttle assembly will secure them to the rail system and/or ladder.

Once a technician reaches the top of the ladder, they may need to detach from the rail/ladder if they want to dismount. For example, a technician may be using a shuttle assembly to connect to a rail integrated into a ladder that leads to a roof hatch; once the technician scales the ladder and reaches the roof hatch, they will need to detach from the rail system to step out onto the roof. During this period, there is still the risk of falling and sustaining serious injury.

Through applied effort, ingenuity, and innovation, Applicant has solved problems relating to rail systems and shuttle assemblies by developing solutions embodied in the present disclosure, which are described in detail below.

SUMMARY

In general, embodiments of the present disclosure provide systems, assemblies, methods, and/or the like. In accordance with various embodiments of the present disclosure there is provided a rail system including a vertical rail aligned vertically and comprising a vertical track; a changeover rail comprising a first portion, second portion, and a changeover track, wherein the first portion is configured to operably connect to the vertical rail, wherein the second portion is configured to be fixedly connected to a post, wherein the changeover track is disposed along the first and second portions, wherein the vertical track and the changeover track are configured to be aligned to form a track configured to receive a shuttle assembly configured to travel along the track; and a changeover mechanism configured to operably attach the vertical rail and the changeover rail.

In some embodiments, the second portion and the first portion are perpendicular to each other.

In some embodiments, a first component of the changeover mechanism is attached to the changeover rail and a second component of the changeover mechanism is attached to the vertical rail.

In some embodiments, the first component includes a latch strike and the second component includes a latch bolt configured to engage the latch strike and thereby secure the changeover rail to the vertical rail.

In some embodiments, the first component includes a pin hole and the second component includes a pin configured to engage the pin hole and thereby secure the changeover rail to the vertical rail.

In some embodiments, the rail system includes the post and a rotatable joint, wherein the rotatable joint is fixed to the post, and wherein the rotatable joint is configured to connect the second portion of the changeover rail to the post such that the changeover rail is rotatable relative to the post.

In some embodiments, the rotatable joint is configured to transition from a locked position wherein the changeover rail is in a fixed position and an unlocked position wherein the changeover rail is rotatable relative to the post.

In some embodiments, the rail system further includes a shuttle system, wherein the shuttle system comprises a shuttle body, an absorber body, one or more wheels fixedly attached to the shuttle body and configured to enable the shuttle system to travel along the track, and an attachment mechanism configured to secure the shuttle system to a user.

In some embodiments, the attachment mechanism is a carabiner.

In some embodiments, the rail system further includes a ladder, wherein the vertical rail is integrated into at least a portion of the ladder.

In some embodiments, the post is fixedly attached to a surface that is perpendicular to the vertical rail, such that the post is parallel to the vertical rail.

According to various embodiments, there is provided a method of using a rail system, the method including removing a changeover rail from a fixed position; rotating the changeover rail to align the changeover rail with a vertical rail; operably engaging the changeover rail with the vertical rail, such that a track runs from the vertical rail to the changeover rail for a shuttle assembly; and locking, by a changeover mechanism, the changeover rail to the vertical rail.

In some embodiments, the method further includes unlocking, by the changeover mechanism, the changeover rail from the vertical rail, and placing the changeover rail in the fixed position.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

According to various embodiments, a shuttle assembly may be configured to reduce and/or prevent fall damage when used with a rail system. Shuttle assembly may secure the user to one or more rails of the rail system that may run along or be integrated with a ladder. In some embodiments the shuttle assembly may be configured to "catch" a user or slow their fall when the user loses their grip while climbing on the rail system and/or ladder.

In some embodiments, the shuttle assembly may include an attachment mechanism (e.g., a carabiner) looped into a harness or belt worn by the user; the attachment mechanism may be attached to a shuttle body of the shuttle system including one or more wheels for sliding along the rails. In addition to the shuttle body and the attachment mechanism, the shuttle assembly may include an absorber configured to absorb one or more dynamic loading forces the shuttle assembly may be subject to (i.e., if/when the user falls and the shuttle assembly is engaged).

In some embodiments, the rail system may be configured to "changeover" from one rail to another. In some embodiments, the rail system may include a vertical rail that may be a vertical rail aligned along or integrated with a ladder and a changeover rail that may be a curved rail extending from the vertical rail and moving across a surface transverse to the ladder/vertical rail (e.g., a roof). In some embodiments, the curved (second) rail may be operably attached and detached from the vertical (first) rail, as desired, to link the two rails in the rail system. In some embodiments, the curved rail may be fixedly attached to a fixed structure (e.g., a metal bar or post) on the transverse surface (e.g., on the roof). It will be understood that additional rails beyond the first and second may be used with the rail system.

Example Rail Systems

Figure 1:
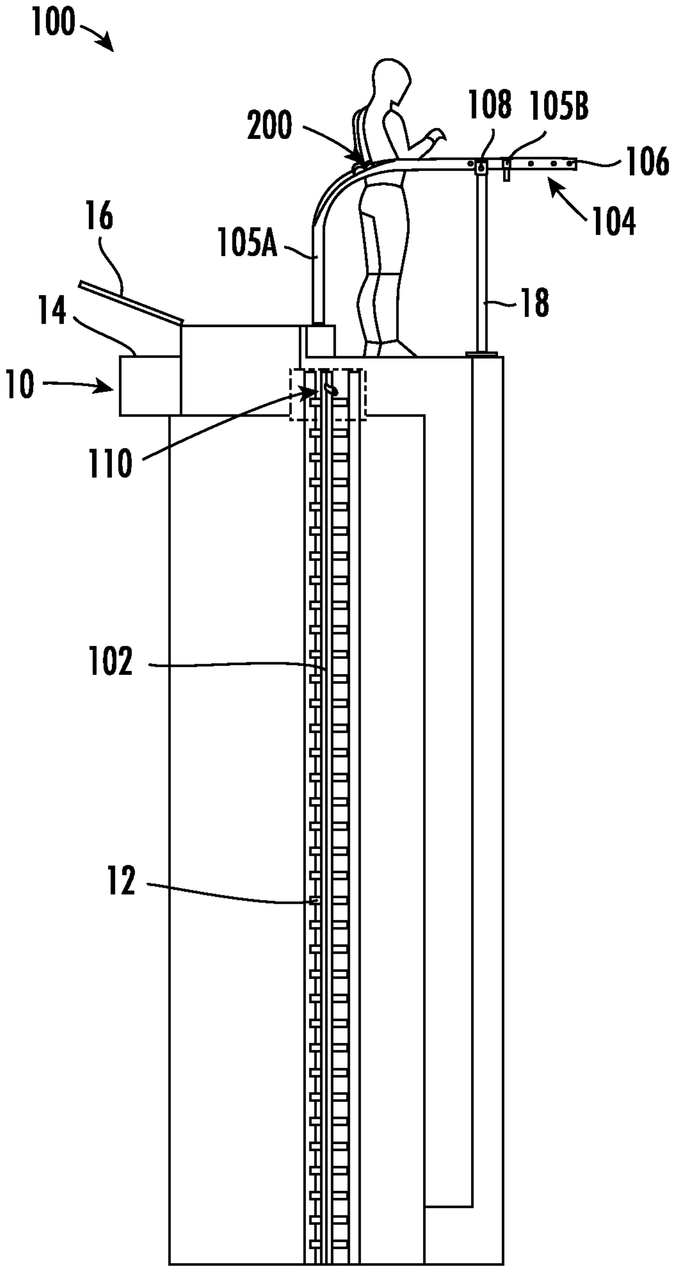
FIG. 1 shows an angled view of an example rail system in accordance with various embodiments of the present disclosure.

FIG. 1 shows an example rail system 100 in accordance with various embodiments of the present disclosure. In some embodiments, the rail system 100 may be configured to reduce and/or prevent fall damage to a user of the rail system 100.

In some embodiments, the rail system 100 may be integrated with a structure 10. In some embodiments, the structure 10 may be a building or an access shaft for reaching the top of a building. It will be understood that a wide variety of structures may be used with the rail system 100. In some embodiments, the structure 10 may include a ladder 12. In some embodiments, the ladder 12 may be used to reach a roof 14 of the structure 10. In some embodiments, a hatch 16 may be used with the structure 10 to control access to the roof 14. In some embodiments, a post 18 may be fixed to the structure 10. In some embodiments, the post 18 may be a vertical post that is parallel to the ladder 12 and fixed to the roof (e.g., by one or more fastening mechanisms). In some embodiments, and as will be described later in this disclosure, the rail system 100 may be engaged and/or integrated with the rail system 100. In some embodiments, the rail system 100 may include the post 18.

In some embodiments, the rail system 100 includes a vertical rail 102 and a changeover rail 104. In some embodiments, the vertical rail 102 may run along parallel to, or be integrated with, the ladder 12 and/or the like that may be used for reaching a higher elevation (e.g., the roof 14). In some embodiments, the vertical rail 102 may be a rigid, metallic rail structure that spans from a first elevation point (e.g., a floor of the structure 10) to a second elevation point (e.g., the roof 14). In some embodiments, the vertical rail 102 may comprise a vertical track running along the length of the rail and configured to receive a shuttle assembly 200. In some embodiments, the track may be integrated with the vertical rail 102 and disposed on one or more sides of the rail. In some embodiments, the track may be a wheeled track configured to receive one or more wheels of the shuttle assembly 200, as will be described later in this disclosure.

In some embodiments, the changeover rail 104 may be a rail possessing at least some degree of curvature relative to the verticality of the vertical rail 102. In some embodiments, the changeover rail 104 may be configured to operably engage and/or fix to the vertical rail 102 such that the vertical rail 102 and the changeover rail 104 form a single connected rail for the rail system 100. The changeover rail 104 may be in a fixed or "stored" position and/or a connected position wherein it is engaged with the vertical rail 102. In some embodiments, at least a portion of the changeover rail 104 may be disposed perpendicular to the vertical rail 102. In some embodiments, the changeover rail 104 may include a first portion 105A and a second portion 105B.

In some embodiments, the first portion 105A of the changeover rail 104 may be on one end of the changeover rail 104 and the second portion 105B may be on another end of the changeover rail 104. The first portion 105A and the second portion 105B may be integrated as a single component forming the changeover rail 104; in some embodiments, the first and second portions 105A, 105B may be attached by one or more fasteners. In some embodiments, the first portion 105A may be configured to engage with the vertical rail 102 and the second portion 105B may be operably engaged with the post 18. In some embodiments, the first portion 105A and the second portion 105B may be aligned in different directions such that an angle is defined between them. In some embodiments, the first portion 105A and the second portion 105B may be aligned in perpendicular directions.

In some embodiments, the changeover rail 104 may include a changeover track similar in structure in function to that of the vertical track of the vertical rail 102. In some embodiments, the changeover track may be curved along with the changeover rail 104 and configured to align and connect with the vertical track, thereby forming a unified and continuous track along which a shuttle assembly 200 may travel, as will be described in greater detail later in this disclosure.

In some embodiments, one or more connection holes 106 may be disposed on the changeover rail 104. The connection holes 106 may be disposed on the first portion 105A, the second portion 105B, and/or both the first and second portions 105A, 105B.

In some embodiments, the rail system 100 may include a rotatable joint 108 that is configured to operably connect the post 18 and the changeover rail 104. In some embodiments, the rotatable joint 108 may be connected to the changeover rail 104 by one or more fasteners disposed through the connection holes 106 of the changeover rail 104. The rotatable joint 108 may enable the changeover rail 104 to rotate relative to the post 18, which may be fixedly secured to the roof 14. It will be understood that various connection holes 106 may be used to vary the length of the changeover rail 104 that is usable for forming a connection with the vertical rail 102.

In some embodiments, the rail system 100 may include a changeover mechanism 110. In some embodiments, the changeover mechanism 110 may include a first component 111A disposed or otherwise attached to the changeover rail 104 and a second component 111B disposed or otherwise attached to the vertical rail 102. In some embodiments, the changeover mechanism 110 may be a pin attachment mechanism, and the first component may hence be one or more pin holes and the second component may be a pin. In some embodiments, the changeover mechanism may be a latching mechanism and the first component may be a latch strike and the second component may be a latching bolt. It will be understood that a variety of different changeover mechanisms 110 may be used to connect and disconnect the vertical rail 102 and the changeover rail 104, and it will further be understood that the first and second components 111A, 111B may be transposed between the vertical rail 102 and the changeover rail 104, as desired.

Example Shuttle Assemblies

Figure 2:
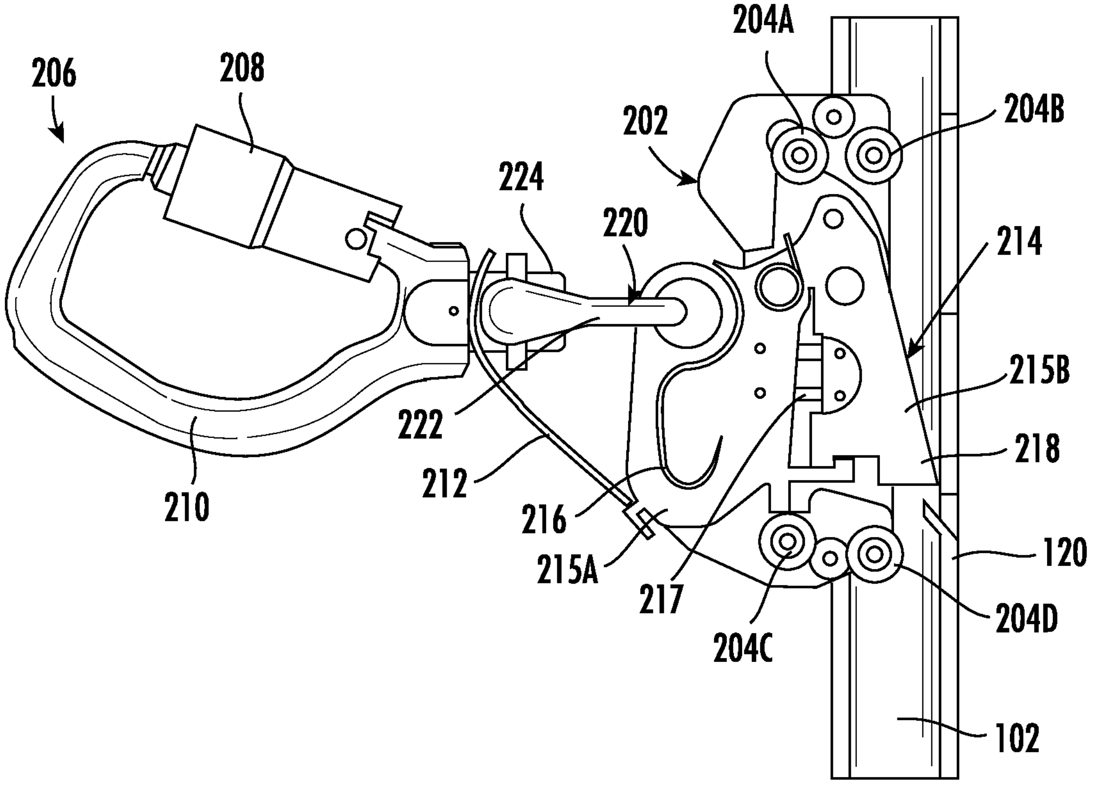
FIG. 2 shows a side plan view of an example shuttle assembly in accordance with various embodiments of the present disclosure.

FIG. 2 shows an isometric view of an example shuttle assembly 200, according to various embodiments. In some embodiments, the shuttle assembly 200 includes a shuttle body 202. In some embodiments, one or more wheels 204A-D may be attached to the shuttle body 202 and configured to run along the vertical rail 102 and/or the changeover rail 104. It will be understood that, though the rail that the shuttle assembly 200 is engaged with in FIG. 2 is the vertical rail 102, the description can apply similarly to the changeover rail 104.

In some embodiments, the shuttle assembly 200 may include an attachment mechanism 206 that may be attached to a harness and/or belt worn by the technician or user. In some embodiments, the attachment mechanism 206 may vary in length as necessary as the technician ascends or descends the ladder 12 and the shuttle assembly 200 moves along the vertical rail 102 (or changeover rail 104, in some embodiments). In some embodiments, the attachment mechanism 206 may be a carabiner and may further be a solid, ring-shaped body configured to be secured or otherwise fastened to a loop or connection point on the harness or belt.

In some embodiments, the attachment mechanism 206 may include a latching mechanism 208. In some embodiments, the latching mechanism 208 may be configured to open or close a loop portion 210 of the attachment mechanism 206. When the loop portion 210 is opened, the attachment mechanism 206 may be secured to one or more other components; that is, one or more components may be secured around or within the loop portion 210. Once the attachment mechanism 206 has been secured to the one or more other components, the latching mechanism 208 may be closed. In some embodiments, the closed latching mechanism 208 may not be opened except by manual input of the technician.

In some embodiments, the shuttle assembly 200 may include an absorber 214. The absorber 214 may be a polygonal body that is configured to deform when subject to one or more loading forces. In at least this way, the shuttle assembly 200 may absorb the one or more loading forces and keep the technician secured to the rail 102/ladder 12. In some embodiments, the absorber 214 may "catch" on a rail nose 120 of the rail system 100. In some embodiments, the absorber 214 may include a first segment 215A and a second segment 215B that may be linked by one or more connection elements 217. In some embodiments, the first segment 215A may be configured to engage with the rail nose 120 while the second segment 215B is connected to the attachment mechanism 206. It will be understood that the first and second segments 215A, 215B may be swapped and/or reoriented as desired, according to various embodiments.

In some embodiments, the absorber 214 may define a line of deformation (LOD) 216. The absorber 214 may be configured to deform along the LOD 216. In some embodiments, the LOD 216 may be defined during manufacturing of the absorber 214, such that the absorber 214 deforms along a desired path/trajectory when the shuttle assembly 200 is subject to the one or more loading forces.

In some embodiments, the shuttle assembly 200 may include a linking cable 212. In some embodiments, the cable 212 may be configured to connect the attachment mechanism 206 to the shuttle body 202.

In some embodiments, the absorber 214 may define a nose portion 218. The nose portion 218 may be positioned in proximity to the rail 102 when the shuttle assembly 200 is engaged to the rail 102. The nose portion 218 may be configured to engage/contact the rail 102/rail nose 120 when the absorber 214 is subject to the one or more loading forces and deforms.

In some embodiments, the absorber 214 may be operably engaged with the attachment mechanism 206 via a fastening device 220. In some embodiments, the fastening device 220 may include a loop portion 222. In some embodiments, the loop portion 222 be a solid, half-ring-shaped component through which the attachment mechanism 206 may be connected. The loop portion 222 of the attachment mechanism 206 that may be configured to interlock with the loop portion 222 of the fastening device 220 (e.g., via unlatching the latching mechanism 208, interlocking the loop portions 210, 222, and then latching the latching mechanism 208).

In some embodiments, the attachment mechanism 206 may include a base plate 224. In some embodiments, one or more components of the attachment mechanism 206 may be disposed around the base plate 224; in some embodiments, the distribution may be symmetrical. In some embodiments, the base plate 224 may be a swivel. The swiveling base plate 224 may provide 360° rotation of the attachment mechanism 206 relative to the absorber 214. The base plate 224 swiveling may enable a technician to engage with the attachment mechanism 206 in a variety of positions and configuration when using the shuttle assembly 200.

Example Methods of Using a Rail System and Shuttle Assembly

Figure 3:
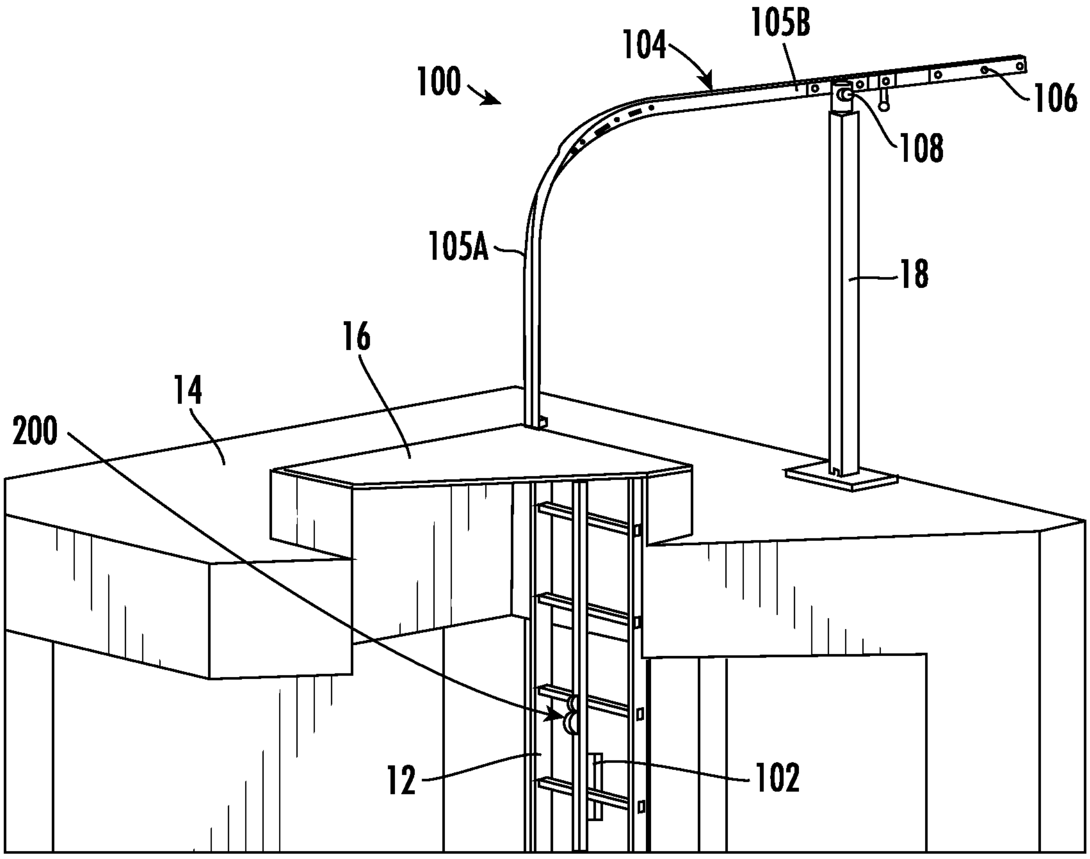
FIGS. 3-11 show isometric views of an example rail system in accordance with various embodiments of the present disclosure.

FIGS. 3-11 show isometric views of example rail systems 100, in accordance with various embodiments of the present disclosure. FIGS. 3-11 also show, according to various embodiments, an example usage of the rail system 100 and the shuttle assembly 200. As shown in FIG. 3, the vertical rail 102 may be aligned along the ladder 12. The shuttle assembly 200 may be attached to the vertical rail 102. It will be understood that a technician, although not shown explicitly in FIGS. 3-11 as shown in FIG. 1, may be secured to the shuttle assembly 200 as he or she climbs the ladder 12, using the hatch 16 to access the roof 14, for example. As further shown in FIG. 3, the changeover rail 104 may be stored in a locked position when it is not connected to the vertical rail 102. The changeover rail 104 may be stored in the locked position when the hatch 16 is closed (as well as when the hatch 16 is open, according to some embodiments).

Figure 4:
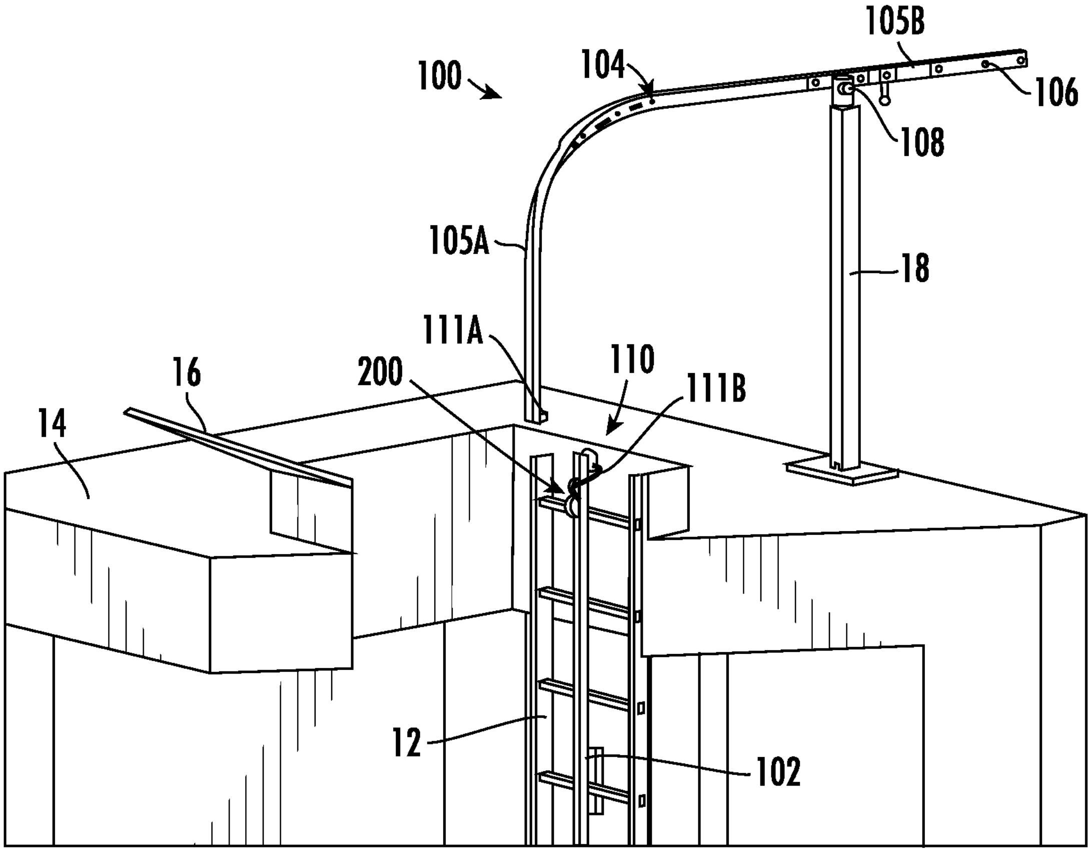

Referring now to FIG. 4, in some embodiments, the hatch 16 may be opened to allow connection between the vertical rail 102 and the changeover rail 104. In some embodiments, the hatch 16 may be opened manually by a technician/user prior to or while climbing the ladder 12. In some embodiments, the hatch 16 may be opened automatically via one or more mechanisms as the technician/user climbs to the roof 14.

Figure 5:
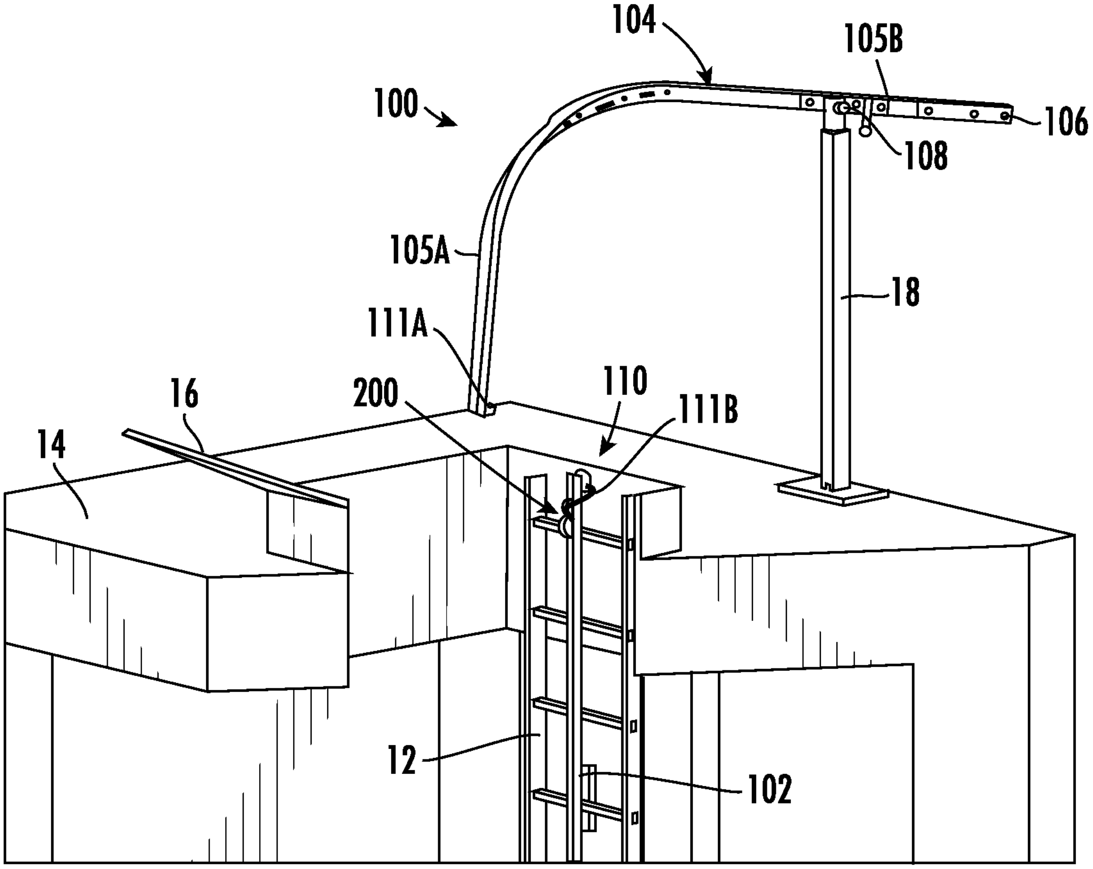
Figure 6:
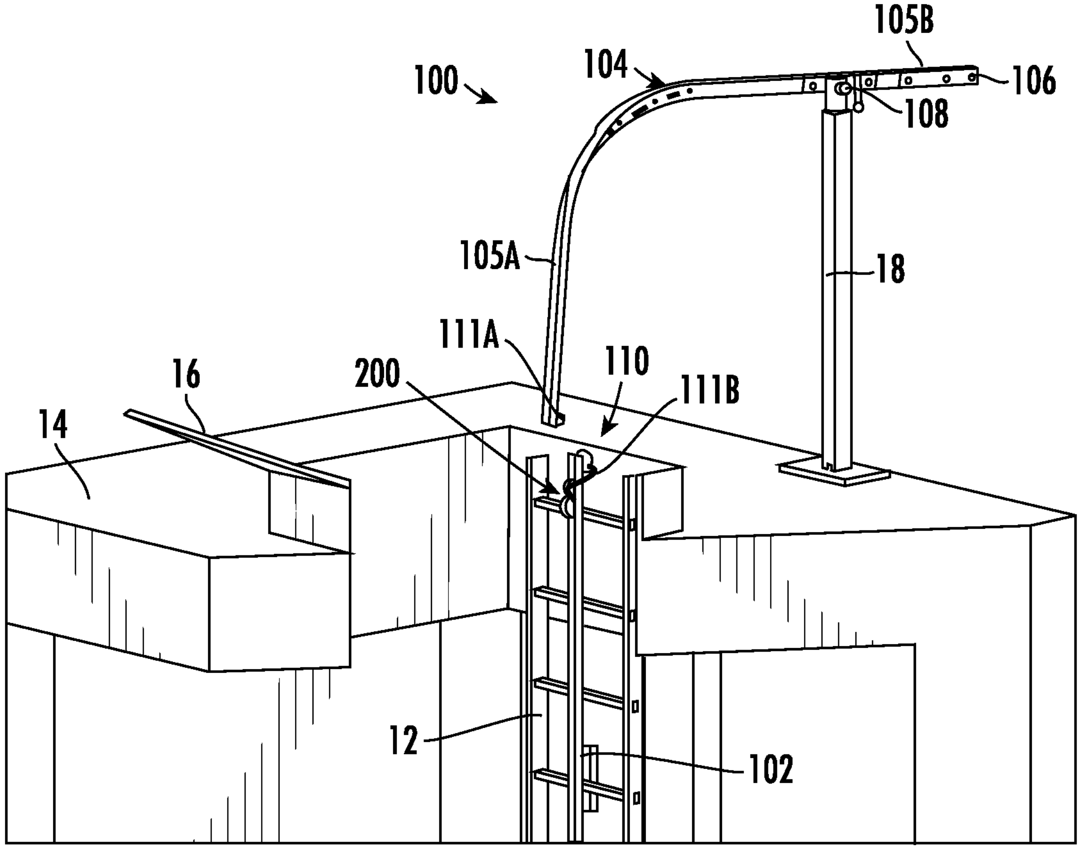

Referring now to FIGS. 5 and 6, in some embodiments, the changeover rail 104 may be rotated using the rotatable joint 108. As with the hatch 16, the rotatable joint 108 may be manipulated manually (e.g., by the technician when he or she is at the top of the ladder 12), or may be controlled via some mechanism to rotate out of its fixed position.

Figure 7:
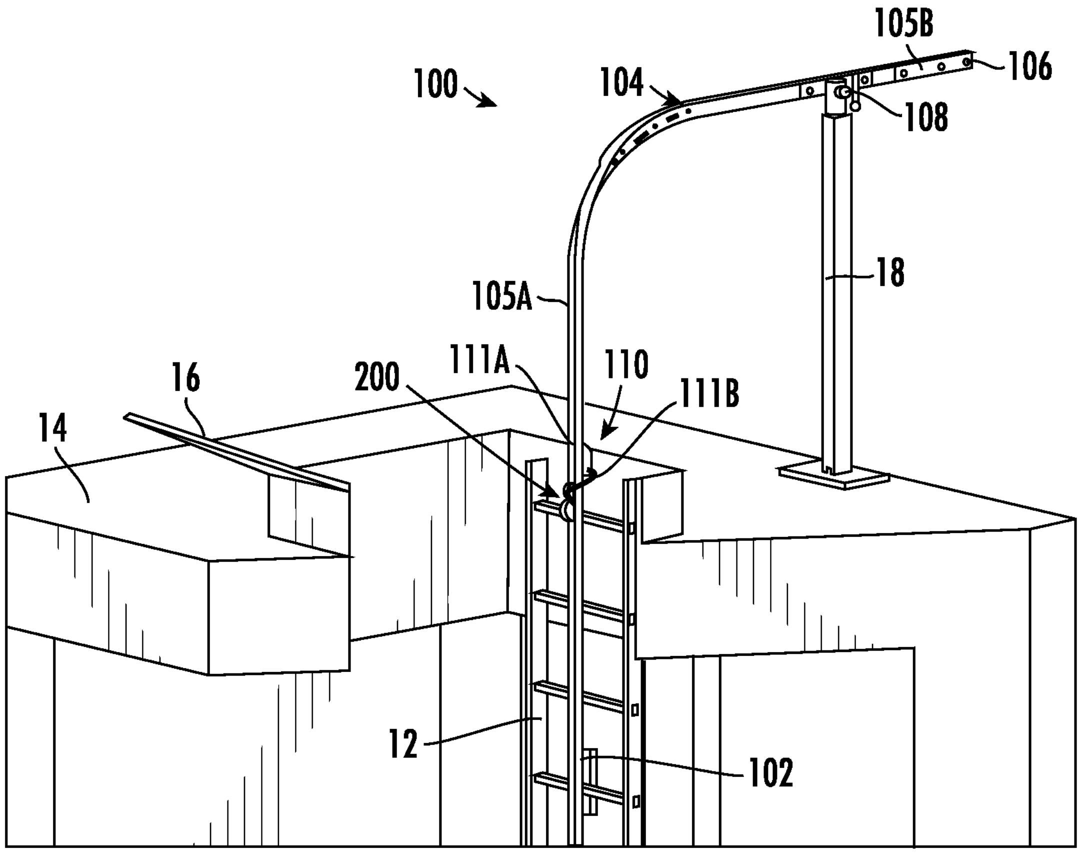

Referring now to FIG. 7, the changeover rail 104 may be aligned with the vertical rail 102. In some embodiments, and as previously described, the first portion 105A may be aligned with the vertical rail 102.

Figure 8:
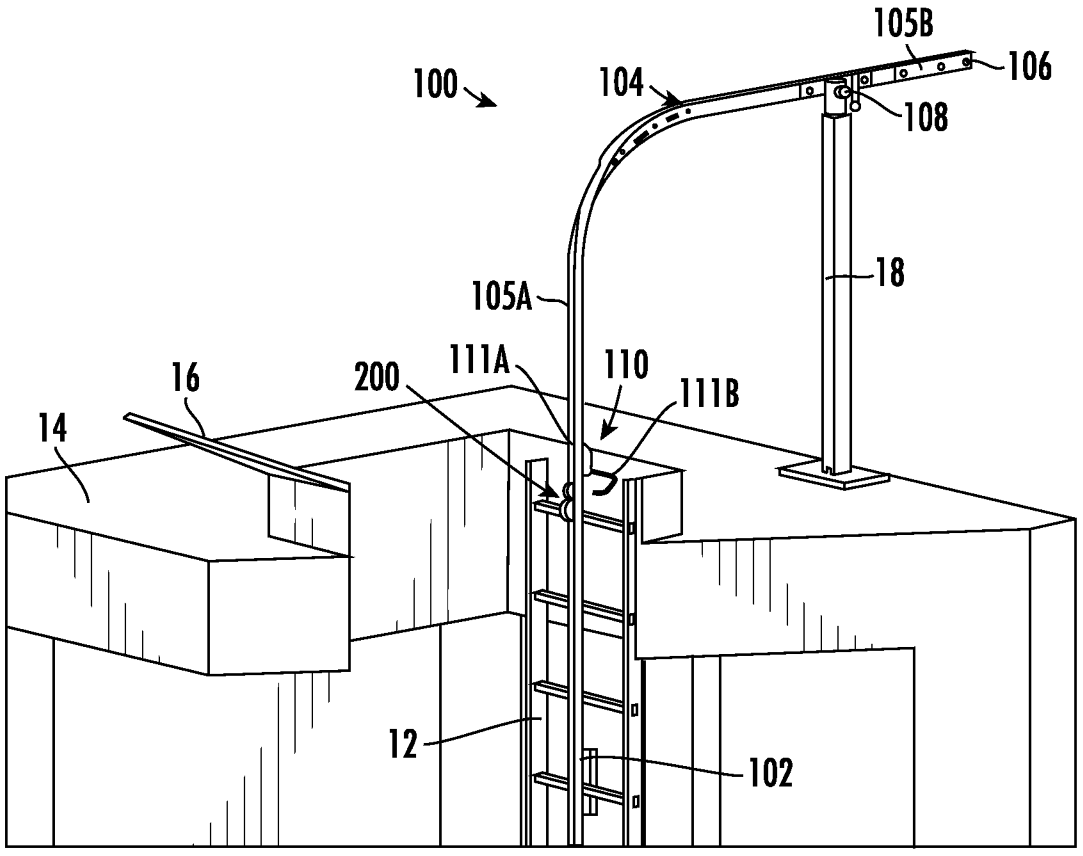
Figure 9:
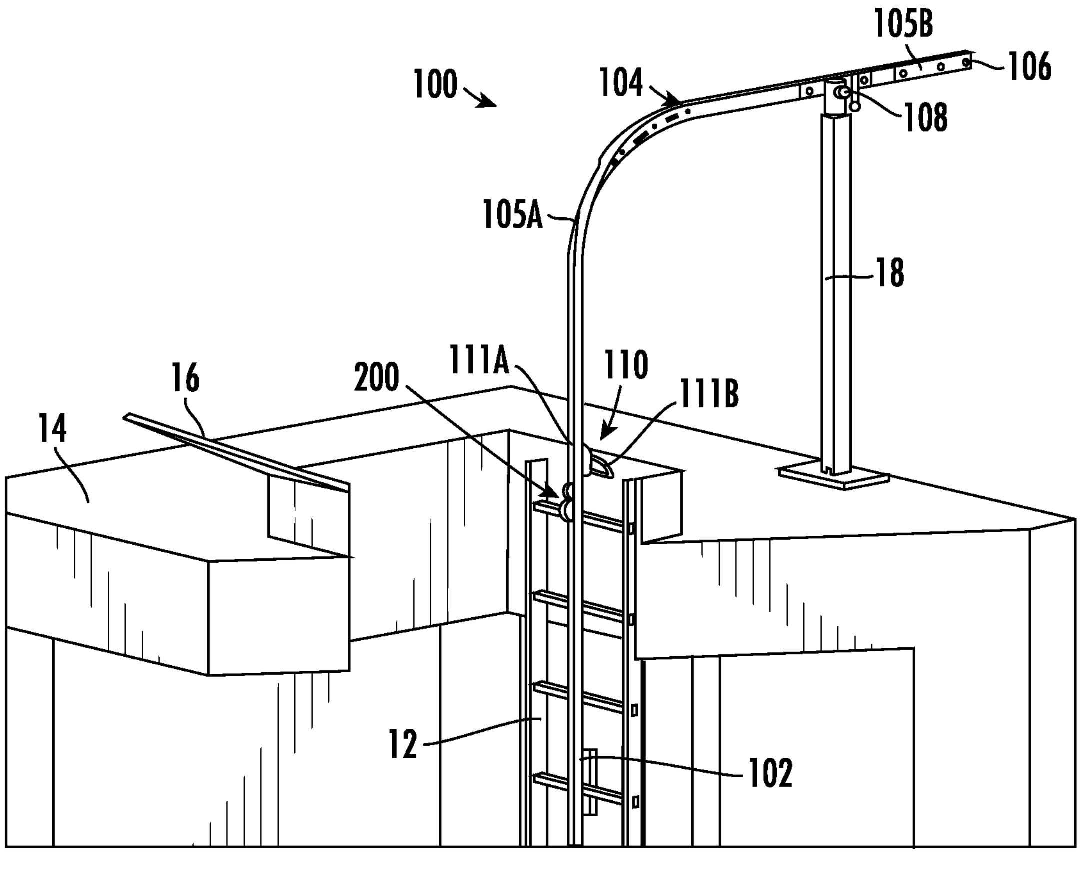
Figure 10:
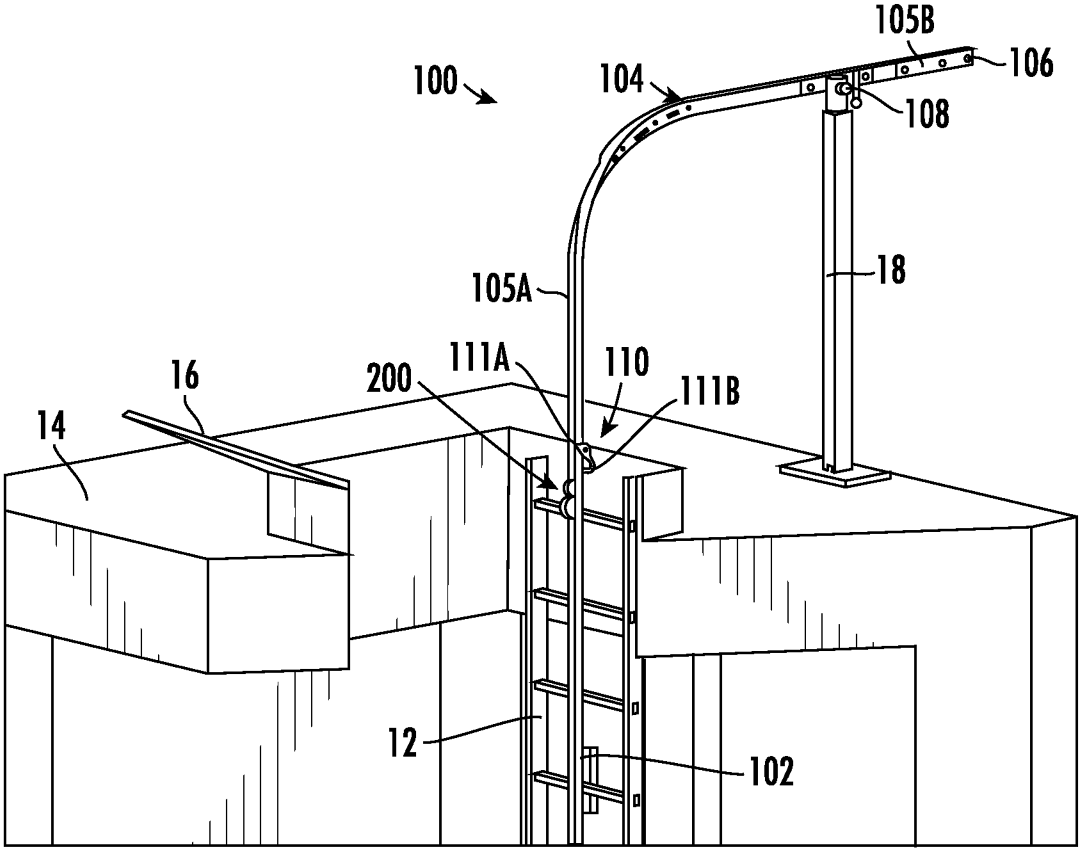
Figure 11:
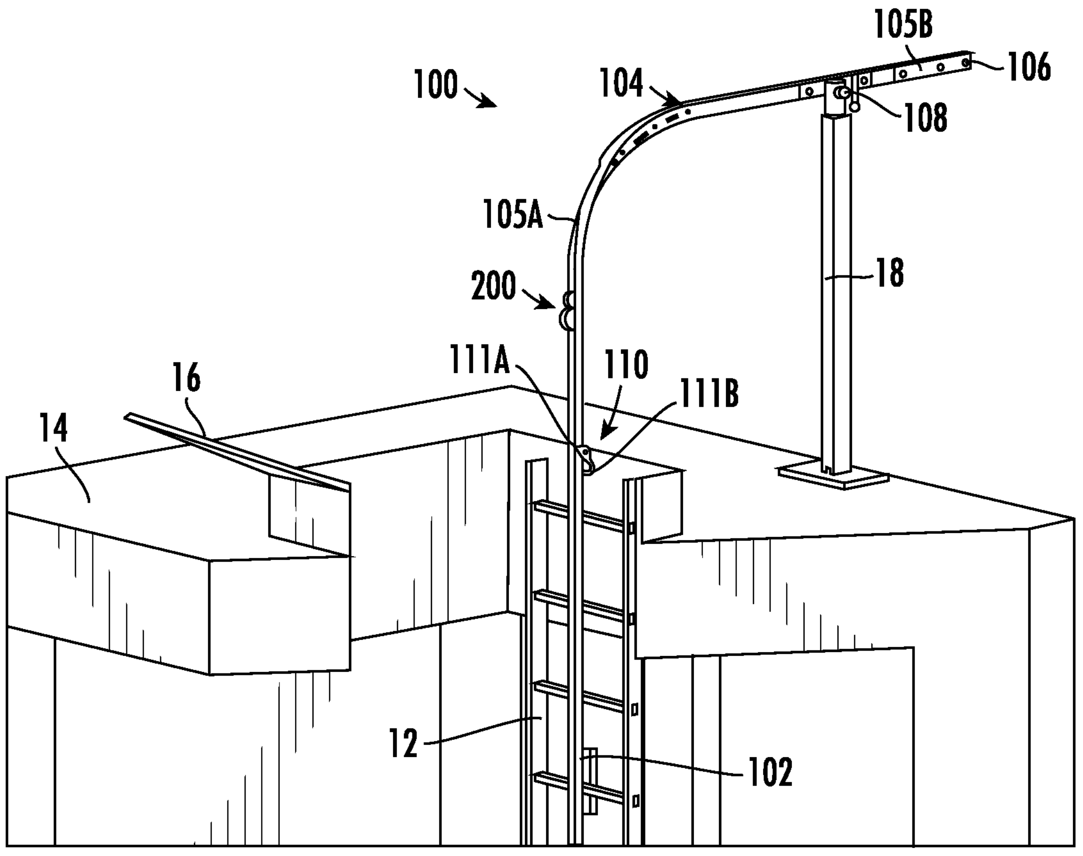

Referring now to FIGS. 8-10, the changeover rail 104 may be locked into its connection with the vertical rail 102 via the changeover mechanism 110. As shown in FIGS. 8-10, the second component 111B of the changeover mechanism 110 (in the example embodiment shown in the Figures, a pin) may be engaged with the first component 111A of the changeover mechanism 110 (in the example embodiment shown in the Figures, a pin hole), thereby securing the vertical rail 102 and the changeover rail 104. In some embodiments, once the vertical rail 102 and changeover rail 104 are connected via the changeover mechanism 110, the vertical track and changeover track may be said to be a single, connected, continuous track along which the shuttle assembly 200 may travel. This can be seen in at least FIG. 11. Hence, via the use of the changeover rail 104 with the rail system, the shuttle assembly 200 may secure a technician to the rail system 100 as he or she dismounts the ladder 12 and steps out onto the roof 14.

Figure 12:
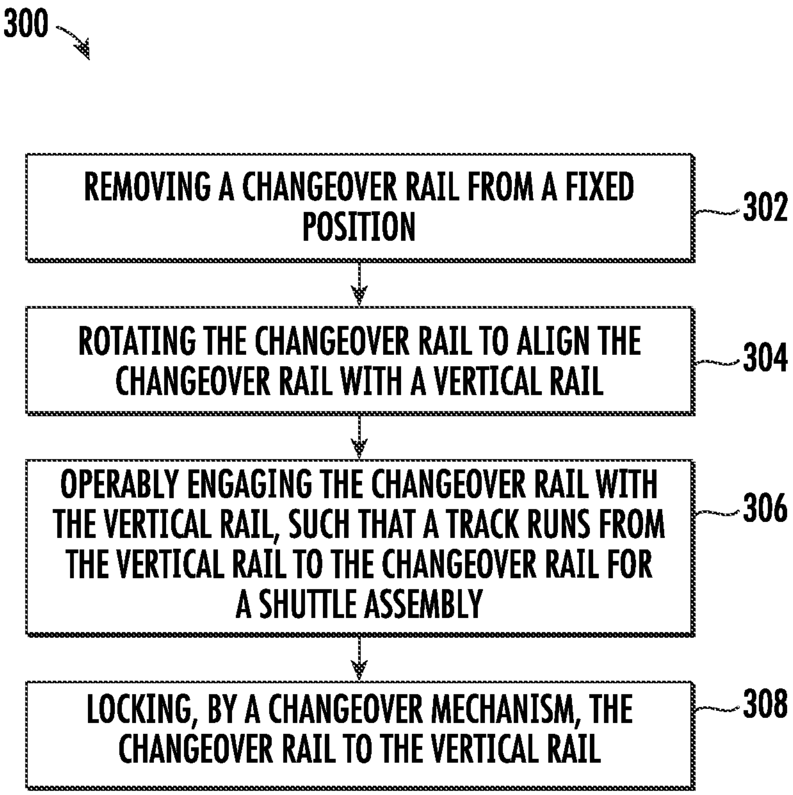
FIG. 12 is a flow chart illustrating an example method of use for a rail system in accordance with various embodiments of the present disclosure.

FIG. 12 shows an example flow chart illustrating steps for an example method 300 of using the rail system 100. It will be understood that, though the method 300 is described with reference to the rail system 100, it may be implemented with various other systems, assemblies, and/or devices as desired.

In some embodiments, the method 300 may include a step 302 of removing a changeover rail from a fixed position. This step 302 may be performed manually (e.g., by the technician/user while he or she is climbing the ladder but has not yet ascended to the roof) or automatically (e.g., via one or more automatic attachment mechanisms). Once the changeover rail has been removed from the fixed position, the changeover rail may be manipulated and rotated relative to the post such that it may be attached to the vertical rail.

In some embodiments, the method 300 may include a step 304 of rotating the changeover rail to align the changeover rail with a vertical rail. The step 304, as with the step 302, may be performed manually or automatically. In some embodiments, the rotation may be enabled by the rotatable joint that fixes the changeover rail to the post on the roof.

In some embodiments, the method 300 may include a step 306 of operably engaging the changeover rail with the vertical rail, such that a track runs from the vertical rail to the changeover rail for a shuttle assembly. In some embodiments, the operable engagement of the changeover rail with the vertical rail may be engaged by the changeover mechanism, as previously described. In some embodiments, the operable engagement may occur via the vertical rail sliding into a slot on the changeover rail or vice versa. In some embodiments, the changeover mechanism may slot together with the vertical rail.

In some embodiments, the method 300 may include a step 308 of locking, by a changeover mechanism, the changeover rail to the vertical rail. As previously described, in some embodiments, the changeover mechanism may be a latching mechanism including a latch bolt and a latch strike. In some embodiments, the changeover mechanism may be a pin assembly including a pin and one or more pin holes.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A rail system comprising:
- a vertical rail aligned vertically and comprising a vertical track;
- a post comprising a rotatable joint;
- a changeover rail comprising:
  - a first portion configured to operably connect to the vertical rail;
  - a second portion configured to be fixedly connected to the post; and
  - a changeover track disposed along the first and second portions,
- wherein the rotatable joint is fixed to the post, and herein the rotatable joint is configured to connect the second portion of the changeover rail to the post such that the changeover rail is rotatable relative to the post,
- wherein the vertical track and the changeover track are configured to be aligned to form a track configured to receive a shuttle assembly configured to travel along the track; and
- a changeover mechanism configured to operably attach the vertical rail and the changeover rail.

2. The rail system of claim 1, wherein the second portion and the first portion are perpendicular to each other.

3. The rail system of claim 1, wherein a first component of the changeover mechanism is attached to the changeover rail and a second component of the changeover mechanism is attached to the vertical rail.

4. The rail system of claim 3, wherein the first component comprises a latch strike and the second component comprises a latch bolt configured to engage the latch strike and thereby secure the changeover rail to the vertical rail.

5. The rail system of claim 3, wherein the first component comprises a pin hole and the second component comprises a pin configured to engage the pin hole and thereby secure the changeover rail to the vertical rail.

6. The rail system of claim 1, wherein the rotatable joint is configured to transition from a locked position wherein the changeover rail is in a fixed position and an unlocked position wherein the changeover rail is rotatable relative to the post.

7. The rail system of claim 1, further comprising a shuttle system, wherein the shuttle system comprises a shuttle body, an absorber body, one or more wheels fixedly attached to the shuttle body and configured to enable the shuttle system to travel along the track, and an attachment mechanism configured to secure the shuttle system to a user.

8. The rail system of claim 7 wherein the attachment mechanism is a carabiner.

9. The rail system of claim 1, further comprising a ladder, wherein the vertical rail is integrated into at least a portion of the ladder.

10. The rail system of claim 1, wherein the post is fixedly attached to a surface that is perpendicular to the vertical rail, such that the post is parallel to the vertical rail.

11. A method of using a rail system, the method comprising:

removing a changeover rail from a fixed position, the changeover rail comprising a first portion, a second portion, and a changeover track disposed along the first and second portions;

rotating the changeover rail relative to a post by a rotatable joint to align the changeover rail with a vertical rail, the vertical rail aligned vertically and comprising a vertical track, wherein the rotatable joint is fixed to the post and configured to fixedly connect the second portion of the changeover rail to the post;

operably engaging the first portion of the changeover rail with the vertical rail, such that the vertical track and the changeover track are aligned to form a track that runs from the vertical rail to the changeover rail for a shuttle assembly, the shuttle assembly configured to travel along the track; and locking, by a changeover mechanism, the changeover rail to the vertical rail.

12. The method of claim 11, further comprising unlocking, by the changeover mechanism, the changeover rail from the vertical rail, and placing the changeover rail in the fixed position.

* * * * *